United States Patent
Leone et al.

(10) Patent No.: US 8,239,122 B2
(45) Date of Patent: Aug. 7, 2012

(54) VEHICLE SURGE AND SPARK TIMING CONTROL

(75) Inventors: Thomas G. Leone, Ypsilanti, MI (US);
Ralph Wayne Cunningham, Milan, MI (US); Eric Tseng, Canton, MI (US);
Davor David Hrovat, Ann Arbor, MI (US); Mrdjan J. Jankovic, Birmingham, MI (US); Diana Yanakiev, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1057 days.

(21) Appl. No.: 12/173,304

(22) Filed: Jul. 15, 2008

(65) Prior Publication Data
US 2010/0017101 A1    Jan. 21, 2010

(51) Int. Cl.
*G06F 19/00* (2011.01)
*F02P 5/152* (2006.01)
*B60W 10/06* (2006.01)
*B60W 10/18* (2012.01)

(52) U.S. Cl. ....... 701/111; 701/70; 701/87; 123/406.29; 123/406.48; 477/107; 477/111; 477/185

(58) Field of Classification Search ............. 123/406.26, 123/406.29, 406.48, 406.5, 406.51; 701/54, 701/70, 82, 84, 87, 102, 103, 110, 111; 477/107, 477/111, 184–187
See application file for complete search history.

(56) References Cited

U.S. PATENT DOCUMENTS

| | | | |
|---|---|---|---|
| 4,513,716 A | | 4/1985 | Haraguchi et al. |
| 5,041,976 A | * | 8/1991 | Marko et al. ................. 701/102 |
| 5,097,809 A | | 3/1992 | Sekozawa et al. |
| 5,224,452 A | | 7/1993 | Tomizawa |
| 5,535,722 A | | 7/1996 | Graessley et al. |
| 5,577,474 A | | 11/1996 | Livshiz et al. |
| 5,584,276 A | | 12/1996 | Tomisawa |
| 5,701,868 A | | 12/1997 | Tomisawa |
| 5,762,366 A | | 6/1998 | Faye |
| 5,857,445 A | | 1/1999 | Shimada et al. |
| 6,334,424 B1 | | 1/2002 | Ito |
| 6,553,958 B1 | | 4/2003 | Kolmanovsky et al. |
| 6,675,087 B2 | * | 1/2004 | Cullen ........................... 701/110 |
| 6,751,543 B2 | | 6/2004 | Gras et al. |
| 7,213,573 B2 | | 5/2007 | Daniels et al. |
| 7,779,812 B2 | * | 8/2010 | Leone et al. ................... 123/403 |
| 7,942,127 B2 | * | 5/2011 | Leone et al. ................... 123/403 |
| 8,095,254 B2 | * | 1/2012 | Heap et al. ....................... 701/22 |

OTHER PUBLICATIONS

Tseng et al., "Spark Timing Adjustment Based on Vehicle Acceleration", U.S. Appl. No. 12/173,296, filed Jul. 15, 2008, 36 pages.
Leone et al., "Vehicle Stability and Surge Control", U.S. Appl. No. 12/173,310, filed Jul. 15, 2008, 36 pages.

* cited by examiner

*Primary Examiner* — Willis Wolfe, Jr.
(74) *Attorney, Agent, or Firm* — Allan J. Lippa; Alleman Hall McCoy Russell & Tuttle LLP

(57) ABSTRACT

A method is described for operating an engine of a vehicle, the engine having a combustion chamber. The method may include controlling a stability of the vehicle in response to a vehicle acceleration; and adjusting spark timing in the combustion chamber of the engine in response to a knock indication, and further adjusting spark timing in response to the vehicle acceleration to reduce surge.

20 Claims, 5 Drawing Sheets

VEHICLE SURGE AND SPARK TIMING CONTROL

FIELD

The present application relates to engine control using accelerometers to detect vehicle surge.

BACKGROUND AND SUMMARY

Vehicles may experience fluctuation in engine torque, manifested as a vehicle oscillation, and which may be referred to as surge. Surge may be caused by poor combustion stability due to a variety of engine operating conditions, including air-fuel ratio, burnt gas amount, fueling, and ignition timing. Poor combustion stability may be caused or aggravated by changes in environmental factors including ambient temperature, altitude, humidity, and others.

One example approach for addressing surge in a lean burn engine adjusts air-fuel ratio. For example, in U.S. Pat. No. 5,857,445, the engine control is switched from a lean combustion state to a stoichiometric combustion state in response to surge. In particular, changes in engine speed provide a surge index, which is then used to adjust the fuel injection amount, and thus the air-fuel ratio.

However, the inventors herein have recognized disadvantages with such an approach. For example, surge conditions may be initiated due to degraded feedback knock control, where spark timing is adjusted responsive to a knock indication. Specifically, the engine controller may identify knock via a knock sensor, and retard spark timing in response thereto in order to abate engine knock. However, once the knock is abated, the engine controller may advance spark timing. Under some conditions, the spark timing may be advanced too quickly, or too far, thus again generating knock. This feedback cycle may repeat, thus generating vehicle surge conditions. Additionally, simply operating with excessive spark retard, such as during cold conditions for catalyst warm-up, may also result in engine surge.

In one approach, the above issues may be addressed by a method for operating an engine of a vehicle, the engine having a combustion chamber, comprising: controlling a stability of the vehicle in response to a vehicle acceleration; and adjusting spark timing in the combustion chamber of the engine in response to a knock indication, and further adjusting spark timing in response to the vehicle acceleration to reduce surge. In another approach, the method may include controlling a stability of the vehicle in response to a vehicle longitudinal acceleration indicated from an accelerometer coupled in the vehicle; retarding spark timing in the combustion chamber of the engine from peak torque timing in response to an operating condition; and when vehicle surge is identified by the vehicle acceleration from the accelerometer, advancing spark timing.

In this way, it is possible to take advantage of the acceleration information for both stability control and spark-timing induced surge control. Further, by appropriately adjusting spark timing under appropriate surge conditions as indicated by the vehicle acceleration, surge may be addressed. For example, by adjusting spark timing in response to acceleration to reduce surge when performing feedback knock control, it is possible to compensate for surged induced by the feedback knock control. As another example, by advancing spark timing in response to the vehicle acceleration, it is possible to compensate for effects surge caused by spark retard.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A system and method for operating an engine of a vehicle are described. The vehicle includes one or more acceleration sensors incorporated into a vehicle stability control system, such as a roll stability system. Additionally, information from one or more of the acceleration sensors associated with the stability control system is processed to provide an indication of surge in the longitudinal direction of vehicle travel. In particular, the system may identify surge caused by variation in engine output torque, which is in turn caused by variation in dilution, or by excessive dilution, or by excessive spark retard. In response, the system can adjust operating parameters to manage the dilution and spark retard and their effects, thereby improving drive feel and reducing vehicle surge.

Figure 1:
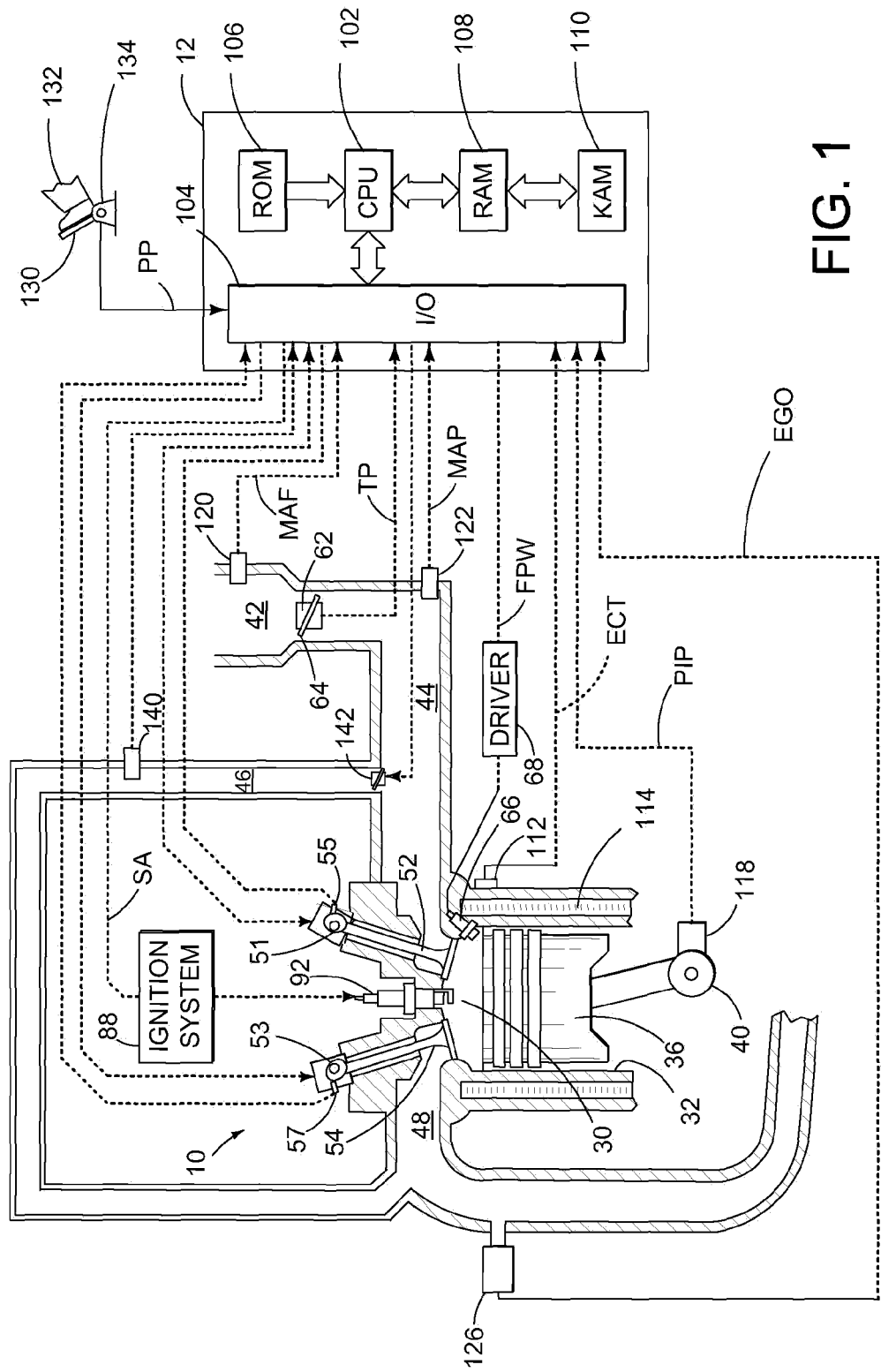
FIG. 1 shows a schematic depiction of one cylinder in the internal combustion engine.

Referring now to FIG. 1, it shows a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

The engine 10 may include an exhaust gas recirculation (EGR) system 46 that receives a portion of an exhaust gas stream exiting the combustion chamber 30, and recirculates the exhaust gases into the intake manifold 44 via an EGR valve 142. The amount of exhaust gases passing to the intake may be determined via a sensor 140.

Engine 10 may dilute the cylinder charge with burnt residual exhaust gases. For example, EGR and adjustment of valve lift/timing of the intake/exhaust valves may be used to provide and adjust the cylinder dilution.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted on the side of the combustion chamber or in the top of the combustion chamber, for example. Fuel may be delivered to fuel injector 66 by a fuel delivery system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance, or spark timing, signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

As described above, FIG. 1 shows only one cylinder of a multi-cylinder engine, and each cylinder may similarly include its own set of intake/exhaust valves, fuel injector, spark plug, etc.

Figure 2:
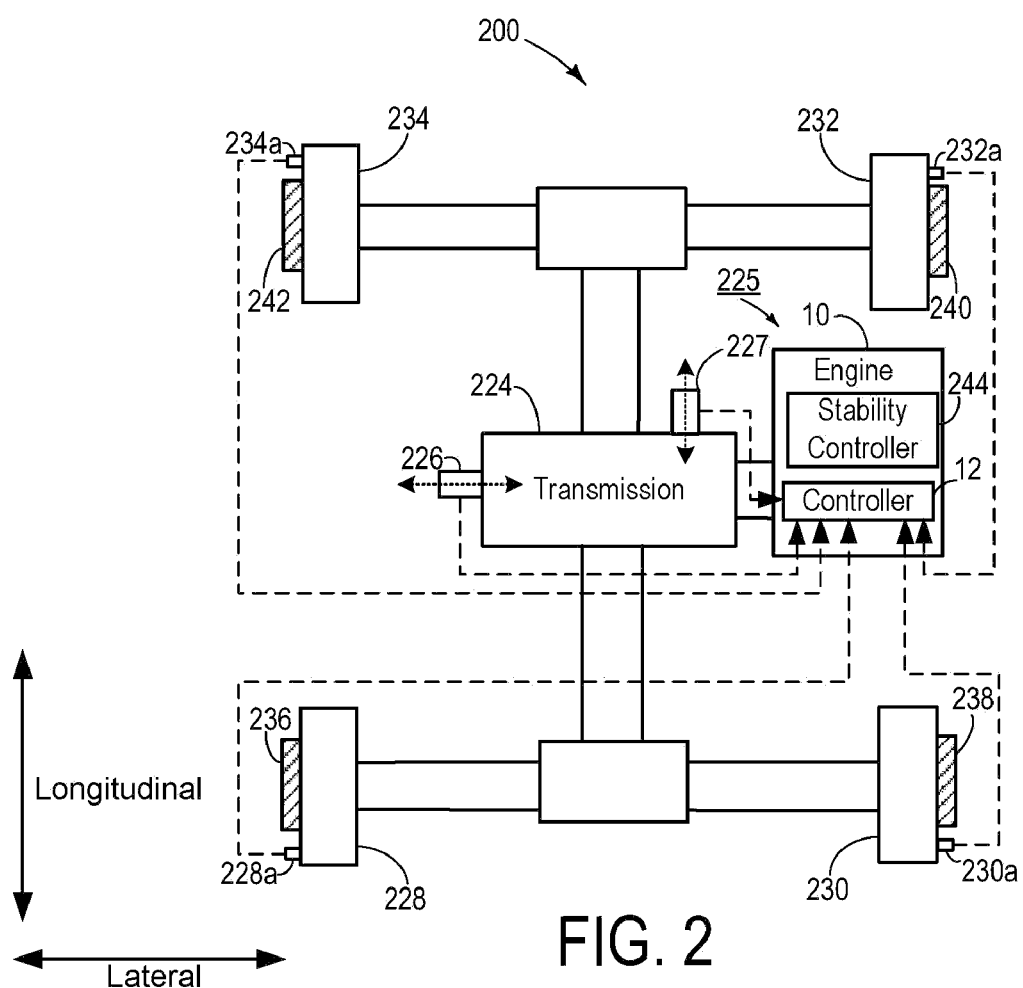
FIG. 2 shows a schematic representation of a vehicle including an engine, transmission, and associated systems.

FIG. 2 shows a schematic depiction of a transmission 224 and a control system 225 in a vehicle 200. The control system may include an Electronic Stability Control ESC system, such as a Roll Stability Control RSC system, discussed in more detail herein.

Engine 10 may be operably coupled to transmission 224. The transmission may have a plurality of selectable gears, allowing the power generated by the engine to be transferred to the wheels. In another example, the transmission may be a Continuously Variable Transmission (CVT), capable of changing steplessly through an infinite number of gear ratios. The transmission may be operably coupled to two or four wheels of the vehicle, (228, 230, 232, and/or 234).

A plurality of acceleration sensors, such as accelerometers, may be coupled to the vehicle. Specifically, in one example, a lateral acceleration sensor 226 and a longitudinal sensor 227 are coupled to the vehicle. The lateral acceleration sensor is configured to measure the lateral acceleration of the vehicle, and the longitudinal acceleration sensor is configured to measure the longitudinal acceleration of the vehicle. In other examples, alternative or additional acceleration sensors may be coupled to the engine, transmission, body structure, or elsewhere, capable of measuring a variety of acceleration components of the vehicle. For example, a yaw sensor may be included in the system. Also, the acceleration sensors, such as 226 and 227, may be independent from the vehicle wheels.

Wheel speed sensors 228a, 230a, 232a, and 234a, may be coupled to each of the vehicle's wheels 228, 230, 232, and 234, respectively. The wheel speed sensors are configured to measure the rotational speed of each individual wheel. Further, wheel brake mechanisms 236, 238, 240, and 242 are coupled to each wheel, 228, 230, 232, and 234, respectively. In this example, the wheel brake mechanisms include actuators (not shown), pads (not shown), rotors (not shown), etc. In other examples, other suitable wheel braking mechanisms may be utilized.

A vehicle stability controller 244 may be electronically coupled to the wheel speed sensors, 228a, 230a, 232a, and 234a, the wheel brake mechanisms, as well as the lateral acceleration sensor 226 and longitudinal acceleration sensor 227. In some examples, vehicle stability controller may be included in engine controller 12. In other examples vehicle stability controller 244 and engine controller 12 may be separate controllers.

The ESC system adjusts vehicle actuators to assist in maintaining the vehicle on the driver's intended course. In one example, the ESC system identifies the driver's intended course from various driver inputs, and monitors various sensors, including the acceleration sensors, to identify deviations from the intended course, as well as potential rolling action of the vehicle. In response to such condition, the system adjusts one or more of the wheel brakes, engine torque, and/or other parameters to reduce deviations in course, and increase the roll stability of the vehicle.

In one embodiment, the actual vehicle motion may be measured via a lateral acceleration, yaw, and/or wheel speed measurement. The intended course may be measured by a steering angle sensor. Further, the ESC system may take actions to correct under-steer or over-steer.

In another embodiment, even when the vehicle is following a desired course, the ESC may take corrective action to increase or improve the vehicle's stability. For example, the RSC system may determine if one or more wheels of the vehicle may lose contact with the road due to an increase in lateral acceleration. If so, the RSC system may brake one or more wheels and/or decrease the power produced by the engine or delivered to the wheels.

Figure 3:
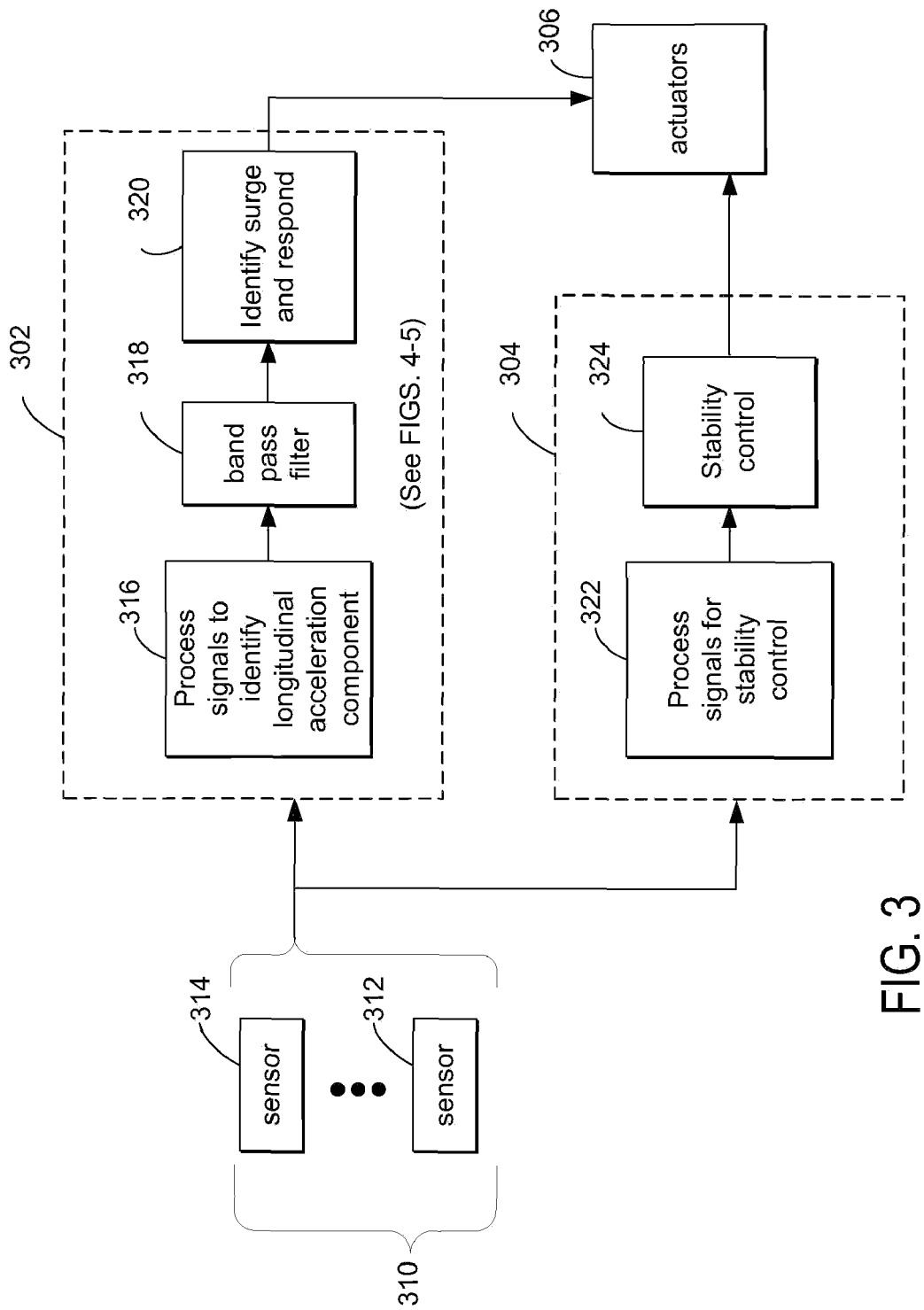
FIG. 3 shows an example block diagram of a surge detection and control sequence.

FIG. 3 shows an example surge compensation block diagram. Specifically, the block diagram shows how one or more accelerations sensors are processed differently to provide a first set of data for vehicle stability control and a second set of data for vehicle surge control. FIG. 3 shows a surge control block 302 and stability control block 304 communicating with sensors 310. The surge control block 302 and the stability control block 304 also communicate with a plurality of engine and vehicle actuators 306.

Sensors 310 may include one or more acceleration sensors (312 to 314), such as sensors 226 and 227. Further, additional sensors may also be used. The engine actuators may include valve timing, air-fuel ratio, airflow, spark timing, etc. The vehicle actuators may include one or more wheel brakes.

Continuing with FIG. 3, surge control block 302 includes initial processing block 316 which identifies a longitudinal acceleration component from sensors 310. For example, data from a plurality of accelerometers, at least some oriented to indicate different directions of acceleration with respect to the vehicle, may be processed to identify longitudinal acceleration component. These components may then be combined to identify a more accurate longitudinal acceleration, that is passed to band pass filter 318.

Band pass filter 318 filters the longitudinal acceleration component at and about a band frequency determined based on an expected surge oscillation frequency. In one example, the band pass filter may reduce the magnitude of frequencies outside the frequency band passed by the filter. The expected surge oscillation frequency may be determined as a function of engine speed, engine load, gear ratio, EGR amount, valve timing, spark timing, spark adjustment feedback gains for knock-sensor based spark control, etc. In one example, as the engine speed increases, the expected surge frequency may increase. Likewise, as the engine torque is reduced, the expected surge frequency may decrease. The output of the filter 318 is passed to the surge compensation block 320, which may execute the routines of FIGS. 4-5, for example.

Concurrently, data from the acceleration sensors 310 is passed to the stability control block 304, where initial processing is carried out at 322, and then the processed data is passed to the stability control block 324. The processing at 322 may include various filtering, including removing signal content at frequencies at or around the expected surge frequency. As described herein, the stability control block 324 may adjust one or more engine or vehicle actuators to increase stability, maintain intended course, or both.

Figure 4:
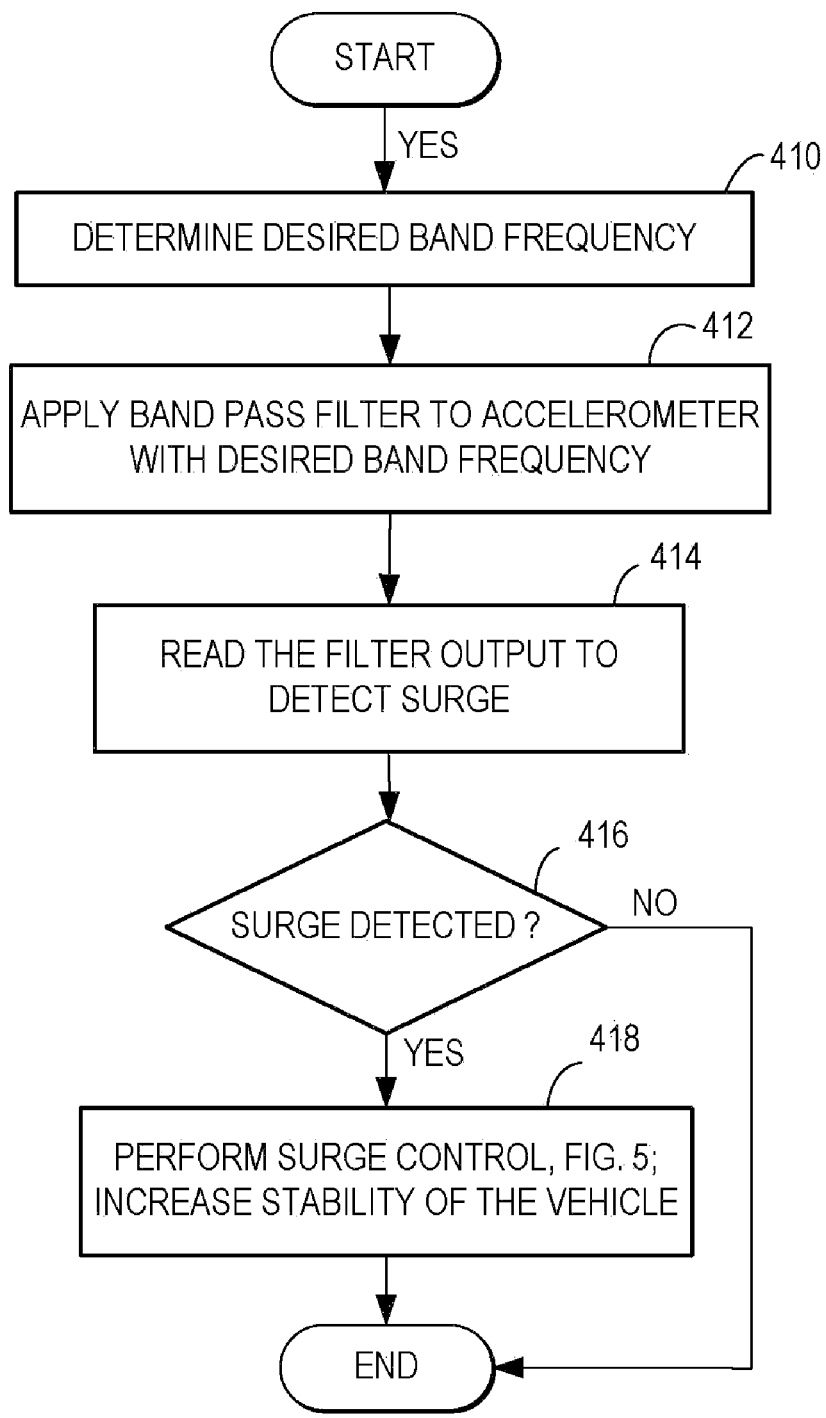
FIG. 4 shows an example process flow of a surge detection routine.

FIG. 4 shows an example process flow of a surge detection routine. At 410, the routine determines a frequency band for band pass filtering longitudinal acceleration data, such as from a longitudinal accelerometer (e.g., 227) in one example. The frequency band may be set around an expected surge frequency.

In one example, the expected surge frequency may be an expected frequency particular to dilution-induced surge. In another example, the expected surge frequency may be based on parameters of the feedback knock control system for adjusting spark timing in response to engine knock. For example, spark timing may be adjusted in a closed-loop manner in response to feedback from a knock sensor, where a knock indication results in spark timing being retarded. The feedback knock control may use a proportional gain, the adjust the amount of retard proportionally to a level of knock, a duration of knock, etc. As such, surge generated at least partially due to knock sensor feedback-based spark control may be expected at particular frequencies related to the feedback control system parameters, such as the feedback gain.

The expected surge frequency may also be based on one or more of the following, engine firing frequency, engine speed, vehicle speed, transmission gear ratio, engine output torque, engine temperature, EGR amount, valve timing, etc. For example, surge may occur at higher frequencies during higher vehicle speeds. Similarly, surge may occur at higher frequencies in lower gears. Accordingly, the desired band frequency may be a function of both vehicle speed and gear ratio to increase with increasing vehicle speed and decrease with increasing gear, where for higher gears, the engine turns at a slower speed for a given wheel speed.

At 412, an acceleration signal from one or more accelerometers, such as 227, is processed with the band pass filter having the desired band frequency from 410. In particular, the acceleration signal may be responsive to various acceleration inputs at a plurality of frequencies. As such, the filter enables the fluctuations correlated to combustion instability caused by excessive dilution and/or spark timing effects to be differentiated and identified. At 414, the routine reads and processes the band pass filter output to identify surge. In one example, the routine identifies surge based on the band pass filtered acceleration, as well as based on various other operating parameters. Further, when the magnitude of a longitudinal component of the acceleration within the band is greater than a predetermined threshold, the controller identifies a surge condition.

At 416, the routine determine whether or not surge is identified. If surge is not identified, then the routine ends. Otherwise, the routine continues to 418 to execute a surge compensation routine such as the example routine described with regard to FIG. 5.

Figure 5:
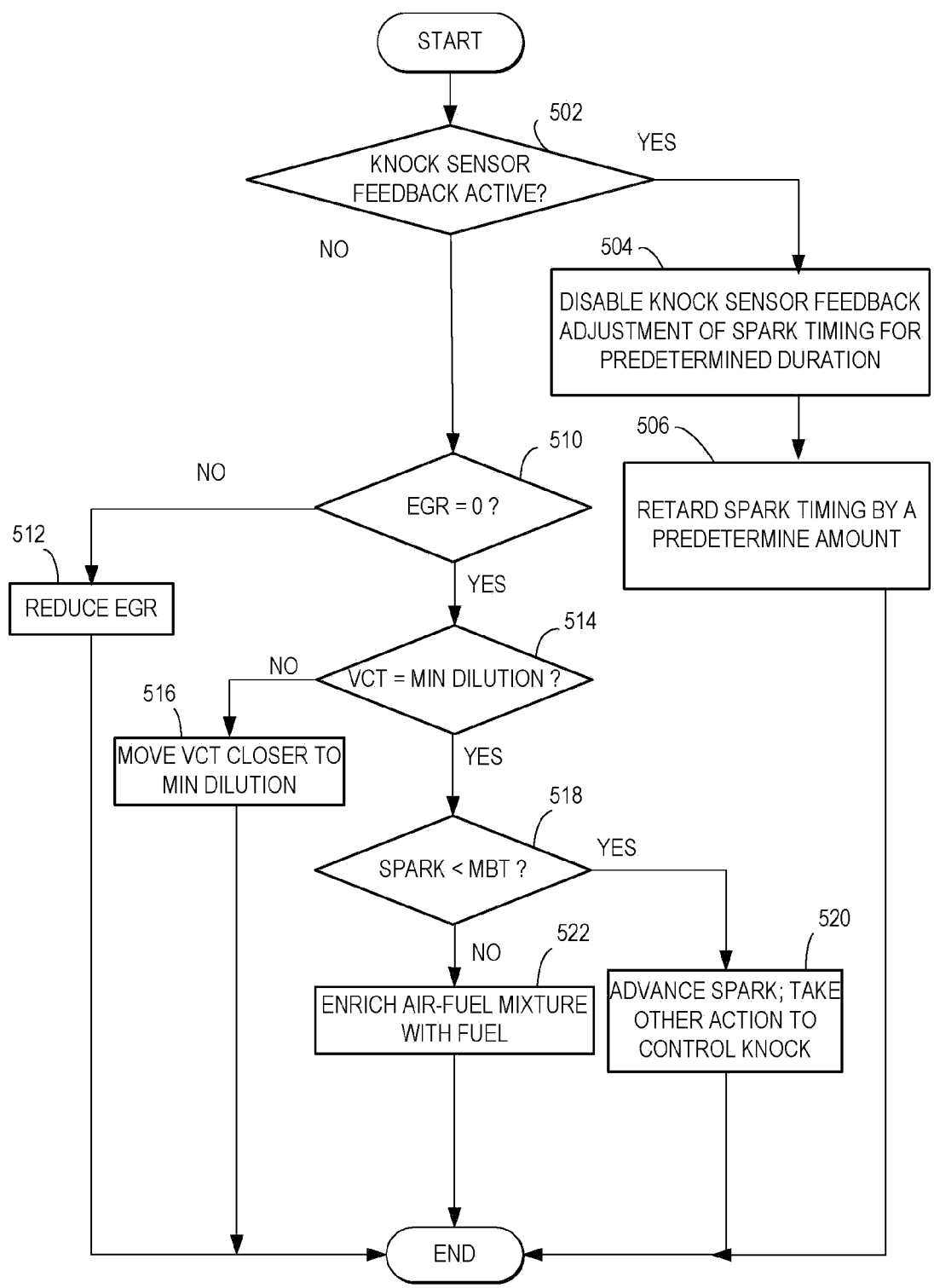
FIG. 5 shows an example process flow of a surge control routine.

FIG. 5 shows an example process flow of a surge control routine. First, at 502, the routine determines whether adjustment of spark timing based on knock sensor feedback is active. For example, the routine may determine whether the spark timing is currently being adjusted (e.g., retarded) due to a knock indication from a knock sensor. If so, the routine continues to 504 to disable the feedback knock control for a duration, and set the spark timing to a predetermine amount of retard from MBT timing, such as 10 degrees, at 506. In this way, the routine may isolate knock sensor feedback as a source of vehicle surge. For example, the routine may disable the knock sensor feedback for a predetermined number of engine cycles, or until a preselected condition is met. The disabling may include setting the spark retard independent from knock sensor feedback during the duration.

If surge continues to persist, still further action may be taken. Specifically, in 510, the routine determines whether the current EGR level is zero. For example, the routine may determine whether a current EGR flow is substantially zero, or determine whether an EGR valve is fully closed. If not, the routine continues to 512 to reduce the EGR amount entering the engine as another approach to reduce surge. Otherwise, the routine continues to 514.

At 514, the routine considers the setting of a variable cylinder valve actuator, such as variable cam timing (VCT). While this example refers to VCT, various other variable valve actuators may be used and considered, such as variable valve lift, variable valve timing, and combinations thereof. Specifically, in 514, the routine determines whether the VCT is at setting which provides a substantially minimal dilution with burned gas, for example minimum valve overlap. The minimal dilution setting may be mapped versus engine operating conditions, such as engine speed and load, for example. If not, the routine continues to 516 to adjust the VCT toward the minimal dilution cam timing. Otherwise, the routine continues to 518.

At 518, the routine determines whether the spark timing is retarded from a peak torque timing, such as MBT timing. Spark timing retard may be present for increasing exhaust gas temperature during catalyst light-off conditions, or due to feedback from a knock sensor indicating engine knock, as noted herein. Further, spark timing may be currently set at a retarded timing independent from knock sensor feedback (see 506). If spark timing is retarded from MBT, the routine continues to 520 to advance spark timing toward the MBT timing. However, as this action may increase a likelihood of engine knock, other mitigating actions may be taken. For example, engine airflow and/or boosting may be reduced to reduce engine load.

Returning to FIG. 5, if spark timing is not retarded from MBT at 518, the routine continues to 522 to enrich the air-fuel mixture in the combustion chamber. The enriched air-fuel ratio may increase combustion stability and thereby reduce surge. For example, during lean combustion, enrichment toward stoichiometry can increase stability. Likewise, during stoichiometric combustion, enrichment toward a rich air-fuel ratio can increase combustion stability. Further still, unintended lean combustion from degraded air-fuel control caused by fuel vapor purging may cause combustion-instability-related surge, and thus enrichment can address this phenomena as well.

Thus, as described above, in one embodiment, the routine first takes action to reduce dilution in response to vehicle acceleration-related surge. In particular, valve operation can be adjusted toward a reduced dilution setting, and exhaust gas recirculation can be reduced. In this manner, exhaust residuals in the combustion chamber can be reduced. However, in some examples, even when EGR is fully reduced, and the valve timing is set to a substantially minimal dilution setting, poor combustion stability may occur and cause surge. As such, the routine can further compensate for such conditions by adjusting another operating parameter of the engine to reduce surge, such as ignition timing and/or combustion air-fuel ratio.

While above embodiment provides one order of adjustment of the various operating parameters, various other alternative orders of adjustment may be used. Further, the parameters may be adjusted concurrently under some operating conditions. Further still, the routine may adjust only a subset, or a single, operating parameter, such as variable cam timing. For example, during one condition, air-fuel ratio may be enriched in response to surge detection from an accelerometer, whereas during another, different condition, cylinder dilution may be adjusted. As noted herein, the dilution in the cylinder can be adjusted by reducing EGR alone. In another example, surge control may be achieved by dilution control, where during one condition EGR is reduced, and during another condition cam timing is adjusted toward the minimal dilution cam timing. In still another example, both the EGR and cam timing can be concurrently adjusted until each reaches the minimal dilution state, and then both ignition timing advance and enrichment can be concurrently performed.

Additionally, other surge mitigating actions may be taken, such as from any of 512 516, 522, and/or 520. These additional mitigating actions may include, under selected conditions, increasing slip across a torque converter coupled between the engine and transmission, or slipping other powertrain transmission clutches. In one particular example, a controlled amount of slip may be provided by adjusting a lock-up clutch of the torque converter. Under such mitigating conditions, the routine may un-lock the torque converter via the clutch and/or increase a controlled amount of slip across the torque converter by modulating the clutch. The clutch may control the slip to a desired level based on feedback from the engine speed and transmission speed sensors (that together provide an indication of slip). The amount of increase in the slip may be proportional to the degree of surge identified via the vehicle acceleration.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine of a vehicle, the engine having a combustion chamber, comprising:
   controlling a stability of the vehicle in response to a vehicle acceleration; and
   adjusting spark timing in the combustion chamber of the engine in response to a knock indication, and further adjusting spark timing in response to the vehicle acceleration to reduce surge.

2. The method of claim 1, wherein controlling vehicle stability includes actuating one or more wheel brake mechanisms in the vehicle, where vehicle roll stability is controlled.

3. The method of claim 1, wherein adjusting spark timing includes setting spark timing independent from feedback from a knock sensor, for at least a duration.

4. The method of claim 1, further comprising adjusting dilution in the combustion chamber in response to the vehicle acceleration.

5. The method of claim 1, further comprising adjusting an additional operating parameter in response to the vehicle acceleration to reduce surge, wherein adjusting the additional operating parameter includes reducing exhaust gas recirculation.

6. The method of claim 1, further comprising adjusting an additional operating parameter in response to the vehicle acceleration to reduce surge, wherein adjusting the additional operating parameter includes enriching an air-fuel ratio in the combustion chamber.

7. The method of claim 1, further comprising adjusting the spark timing in response to a magnitude of the acceleration at or about a surge frequency.

8. The method of claim 7, further comprising filtering the vehicle acceleration to reduce frequencies outside the surge frequency, where the surge frequency is determined based on a parameter of knock feedback control.

9. A system for a vehicle including an engine, the engine having one or more cylinders, comprising:
   a vehicle acceleration sensor coupled in the vehicle;
   a wheel speed sensor coupled to a wheel of the vehicle;
   a wheel brake mechanism coupled to the wheel of the vehicle; and
   a control system for adjusting the wheel brake mechanism in response to the vehicle acceleration sensor to improve the stability of the vehicle during traveling conditions of the vehicle, the control system further filtering the acceleration sensor to pass frequencies at or around a surge frequency, and adjusting spark timing in the one or more cylinders of the engine in response to whether a magnitude of the acceleration at the passed frequencies is greater than a threshold magnitude.

10. The system of claim 9 wherein the control system further includes a band-pass filter configured to pass frequencies at or around the surge frequency.

11. The system of claim 10 where the acceleration sensor is a lateral acceleration sensor.

12. The system of claim 10 wherein the acceleration sensor is a longitudinal acceleration sensor.

13. The system of claim 12 further comprising a knock sensor, wherein the controller disables feedback adjustment of spark timing responsive to the knock sensor and retards spark timing a predetermined amount when the magnitude is greater than the threshold magnitude, the controller further advancing spark timing from the predetermined amount of retard if the magnitude continues to remain greater than the threshold magnitude.

14. A method for operating an engine of a vehicle, the engine having a combustion chamber, comprising:
   controlling a stability of the vehicle in response to a vehicle longitudinal acceleration indicated from an accelerometer coupled in the vehicle;
   adjusting spark timing in the combustion chamber of the engine in response to feedback from a knock indication; and
   when vehicle surge is identified by the vehicle acceleration from the accelerometer, adjusting spark timing to retard spark timing by a predetermined amount, the predetermined amount independent from the knock feedback.

15. The method of claim 14 further comprising band pass filtering the vehicle acceleration to identify vehicle surge, where the spark is adjusted based on the band pass filtered vehicle acceleration to reduce surge, and where the feedback is disabled based on identified surge.

16. The method of claim 15 wherein feedback is disabled for a predetermined duration.

17. The method of claim 15 wherein a band of the band pass filtering is based on a gain of the spark timing feedback adjustment.

18. A method for operating an engine of a vehicle, the engine having a combustion chamber, comprising:
   controlling a stability of the vehicle in response to a vehicle longitudinal acceleration indicated from an accelerometer coupled in the vehicle;
   retarding spark timing in the combustion chamber of the engine from peak torque timing in response to an operating condition; and
   when vehicle surge is identified by the vehicle acceleration from the accelerometer, advancing spark timing.

19. The method of claim 18 wherein the operating condition includes a cold catalyst condition, where spark timing is advanced while reducing engine boost in response to the identified surge.

20. The method of claim 18 further comprising adjusting a torque converter lock-up clutch to increase torque converter slip across in response to the identified surge.

* * * * *